United States Patent [19]
Grover

[11] 3,770,285
[45] Nov. 6, 1973

[54] RING SEAL
[76] Inventor: Richard T. Grover, 8301 W. Edgerton Ave., Greendale, Wis. 53129
[22] Filed: July 21, 1971
[21] Appl. No.: 164,647

[52] U.S. Cl.................. 277/165, 277/216, 277/233
[51] Int. Cl.............................................. F16j 9/00
[58] Field of Search............................ 92/248, 249; 161/406, 115, 123, 189; 277/233, 237, 207, 92, 165, 215

[56] References Cited
UNITED STATES PATENTS

| 2,298,584 | 10/1942 | Onions | 277/165 |
| 2,860,936 | 11/1958 | Habenicht | 277/165 |
| 2,877,071 | 3/1959 | Arnot | 277/216 |
| 3,572,734 | 3/1971 | Holt | 277/165 |
| 3,326,508 | 6/1967 | Born | 161/406 |
| 2,815,252 | 12/1957 | Baker | 161/406 |
| 3,632,459 | 1/1972 | Klaver | 161/189 |
| 3,285,799 | 11/1966 | Peterson | 161/123 |
| 3,636,824 | 1/1972 | Clark | 92/249 |
| 2,644,804 | 7/1953 | Rubin | 277/237 |

Primary Examiner—George E. Lowrance
Assistant Examiner—Robert I. Smith
Attorney—Wheeler, House & Wheeler

[57] ABSTRACT

Actual sealing is done by a metal-filled Teflon polytetrafluoroethylene ring which in practice comprises about 40 per cent virgin Teflon mineral filled with about 60 per cent by weight powdered bronze or glass fiber. The Teflon in sheet form is bonded to a sheet of an elastomer such as synthetic rubber previously patterned on its compression surface to accommodate distortion occurring when the ring is installed. Along opposite margins of the composite sheet, double-coated tapes are applied, these being covered with liners. From the composite sheet, strips are slit or punched in dimensions to fit a grooved piston or the like. Preferably these strips are provided with step-joints cut at the ends of the strips which extend toward the margins to which the double-coated tape and liners have been applied. The rings thus formed are handled flat until applied in their respective grooves. At the time of application, the liner and/or tape is pulled from each ring end, leaving a thin coating of adhesive adhering to the ends of the ring adjacent the step-joint. When the ring is pushed into its groove, this adhesive engages the bottom of the groove and maintains the split ring in assembly with the grooved piston.

4 Claims, 4 Drawing Figures

PATENTED NOV 6 1973

3,770,285

Inventor
Richard T. Grover
By Wheeler, House & Wheeler
Attorneys

RING SEAL

BACKGROUND OF INVENTION

Teflon PTFE is a very desirable material for a packing ring except that it lacks the inherent resilience required to maintain outward packing pressure. An assemblage to provide the radial pressure and facilitate installation of a split ring using Teflon for seal has presented problems solved by the invention.

SUMMARY OF INVENTION

A packing ring of Teflon is added to an elastomeric ring which provides outward supporting pressure and has its inner or compression face so groove or formed as to accommodate deformation of its rubber when the ring is subject to compression.

A first step is the assembly of a sheet laminate having a compression face of rubber grooved or molded. To this is attached some material appropriate for packing, examples being metal-filled Teflon or urethane or the like. To opposite margins of this laminate are applied a tape with double adhesive coating and having one of its faces protected by a liner which is removable when the ring strip is severed and installed in a groove when the ring is mounted.

From the laminate thus produced are severed strips which are to constitute packing rings. Each end of each strip includes part of the coated tape and liner and the blanking of the strips is preferably conducted in such a manner as to form lap joints in these areas. The liner protects that adhesive surface coating which would otherwise be exposed. Consequently, the ring can be handled in flat form pending application in the groove. The protective strip or liner is pulled therefrom at the time of installation in a ring groove, the adhesive remaining on the step-joint and portions of the ring adheres to the bottom of the ring groove and holds the assembly pending insertion of the ring into the cylinder with which it is to co-act.

It will be understood that if dimensionally designed therefor, the packing ring can be inserted in an internal rather than an external groove as, for example, when the packing groove opens inwardly rather than outwardly.

DETAILED DESCRIPTION

Figure 1:
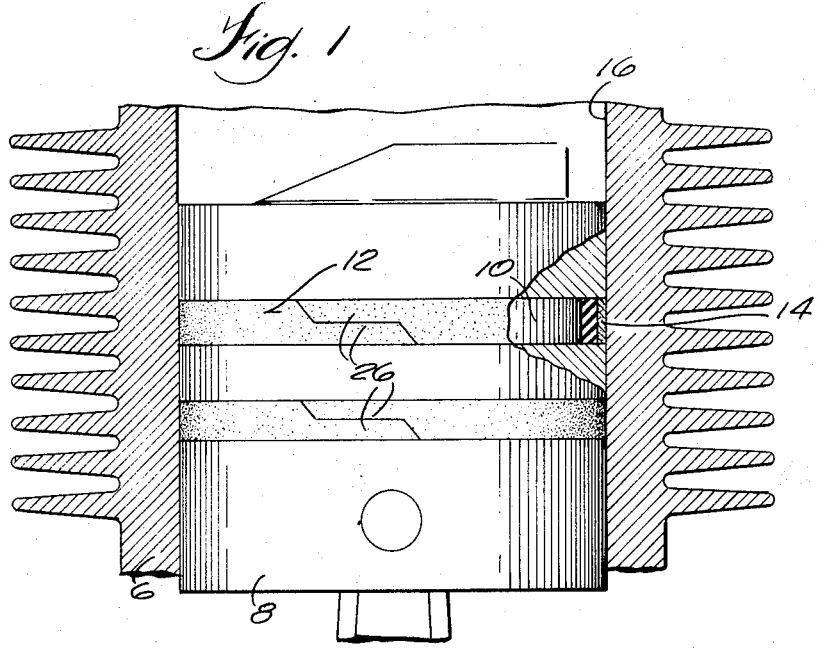
FIG. 1 is a diagrammatic view in cross section through a cylinder, a piston and packing being shown in side elevation with portions broken away.

FIG. 1 illustrates by way of exemplifcation, a cylinder 6 in which a piston 8 is reciprocable. The piston 8 has two ring grooves or channels, one of which is illustrated at 10. Confined in each of these grooves is a laminated packing ring 12. This ring may be continuous or may comprise separately prefabricated sections. For example, a very large piston may have its packing ring 12 divided circumferentially into three parts. The outer ply 14 consists of either virgin or mechanical grade Teflon which may be unfilled but is preferably filled with 60 per cent by weight of metal powder such as bronze. It is also practicable to make this ply of 75 per cent Teflon and 25 per cent glass fiber filling. Commercial thicknesses of the Teflon are 0.020; 0.040; 0.050 and 0.060 according to requirements. The wider the groove in which the packing is to be used, the greater will normally be its radial depth. The packing ply 14 should be of such radial thickness that its exposed face will bear on the cylinder wall 16 and its side surfaces will extend into the groove 10 of the piston.

It will be understood that in many commercial installatons the packing is used in an external member. In such installations, it is the external rather than the internal member which provides the groove, the organization being the mechanical converse of that illustrated for exemplification.

Figure 2:
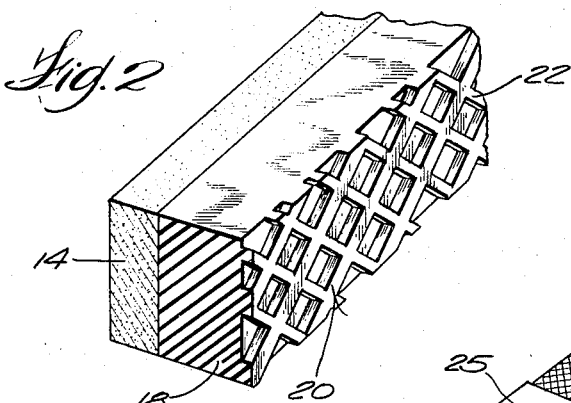
FIG. 2 is a greatly enlarged detail view of a fragmentary portion of a ring embodying the invention.

Teflon, particularly with mineral filling of metal or glass, makes an excellent packing material, except that it requires resilient radial support for maximum sealing efficiency. To provide such support, the Teflon ply 14 is laminated to the ply 18, preferably made of an elastomer such as a synthetic rubber having sufficient resilience to provide the radial pressure needed to effect the seal. A variety of synthetic rubbers may be used. These include Buna N, Nitrile, Hycar, neoprene, polyacrylate, Viton, silicone, and others. The elastomer has a compression face 20 which abuts the bottom of the ring groove. Since such elastomers are substantially incompressible, although readily deformable resiliently, it is desirable to provide relief channels into which the elastomer may deform without exerting undue pressure on the side walls of the groove. In the construction shown in FIG. 2, the elastomeric ply 18 has its surface 20 provided with grooves in the form of cross hatching 22, this being a preferred form of transverse grooving.

Figure 3:
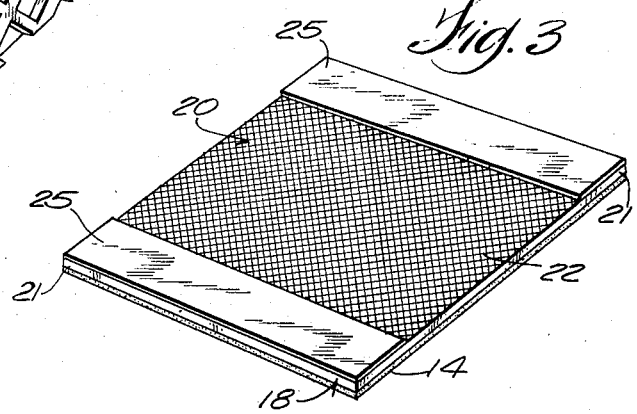
FIG. 3 is a plan view on a reduced scale of a laminate from which ring stips are severed in accordance with the invention.
Figure 4:
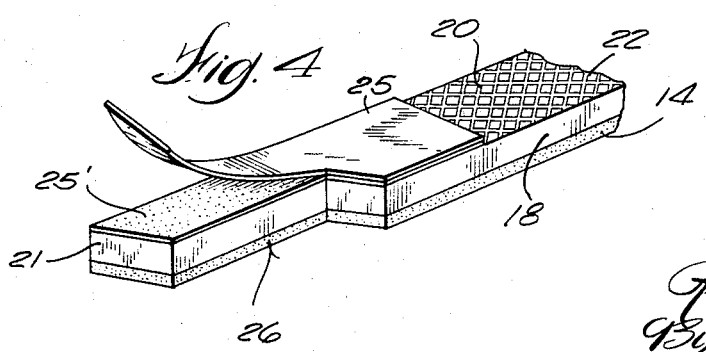
FIG. 4 is an enlarged fragmentary end portion of a severed ring strip.

When the filled resin and elastomer are laminated together in the form of a sheet of appropriate dimensions, a liner 25 is applied adjacent each of the ends 21, this preferably being in the form of a tape double-coated with adhesive as indicated at 25' in FIG. 4. The sheet shown in FIG. 3 is then slit into strips which are to constitute the laminated rings 12 or parts thereof. The ends of these strips may have lap-joints such as those shown at 26 in FIGS. 1 and 4. When the liner 25 is stripped off and the ring is then placed in the groove for which it was designed, and the ends 25 are pushed inwardly, the adhesive borne by such ends adheres to the bottom of the ring groove and maintains the assembly until the piston and packing can be assembled in a cylinder for use.

The layer of adhesive 25' is preferably very thin indeed. It may average approximately 0.006 inches in thickness. I have successfully used Minnesota Mining & Manufacturing Company release tape No. 410 which has adhesive thickness of 0.009. I have also used successfully No. 465 of the same company which has adhesive 0.002 inches in thickness.

Many other companies make acceptable products for this purpose. These include:
  H. B. Fuller Company
  Adhesive Tape Corporation
  B. F. Goodrich
  Devon Tape Corporation While adhesive may be applied directly to the jointed ends of the multi-ply ring, this offers mechanical difficulty and is not regarded as being as satisfactory as having the adhesive applied by means of a readily strippable tape.

I claim:

1. A packing ring comprising a flat strip of generally rectangular cross-section having an outer lamination of polytetrafluoroethylene and an elastomeric inner lamination, said ring having complementary end portions each half as wide as said strip and having parallel edges in said end portions, whereby when said packing ring is installed and radially compressed in a packing groove with said inner lamination wholly within said groove and said outer lamination in contact with a part other than the part which contains the groove, with said ends in laterally lapping relationship, the compression of said inner lamination and the lapping relationship of said complementary end portions causes said ring to compensate for extrusion of said outer lamination and for wear of said outer lamination by movement of said complementary end portions with respect to each other in the direction along said strip to maintain the radial dimension of said installed ring unchanged, without failure of the seal at said ends.

2. A packing ring in accordance with claim 1 in which the outer lamination is mineral filled.

3. A packing ring according to claim 1 in which the synthetic elastomeric lamination has a grooved interior compression face on which said adhesive coating is disposed.

4. A packing ring in accordance with claim 1 in which the inner surface of said inner lamination is provided with an adhesive coating at least in proximity to said complementary end portions.

* * * * *